Jan. 18, 1927.
J. G. G. FROST
1,615,009
PROCESS OF TREATING ALUMINUM DROSS AND THE LIKE
Filed March 17, 1926
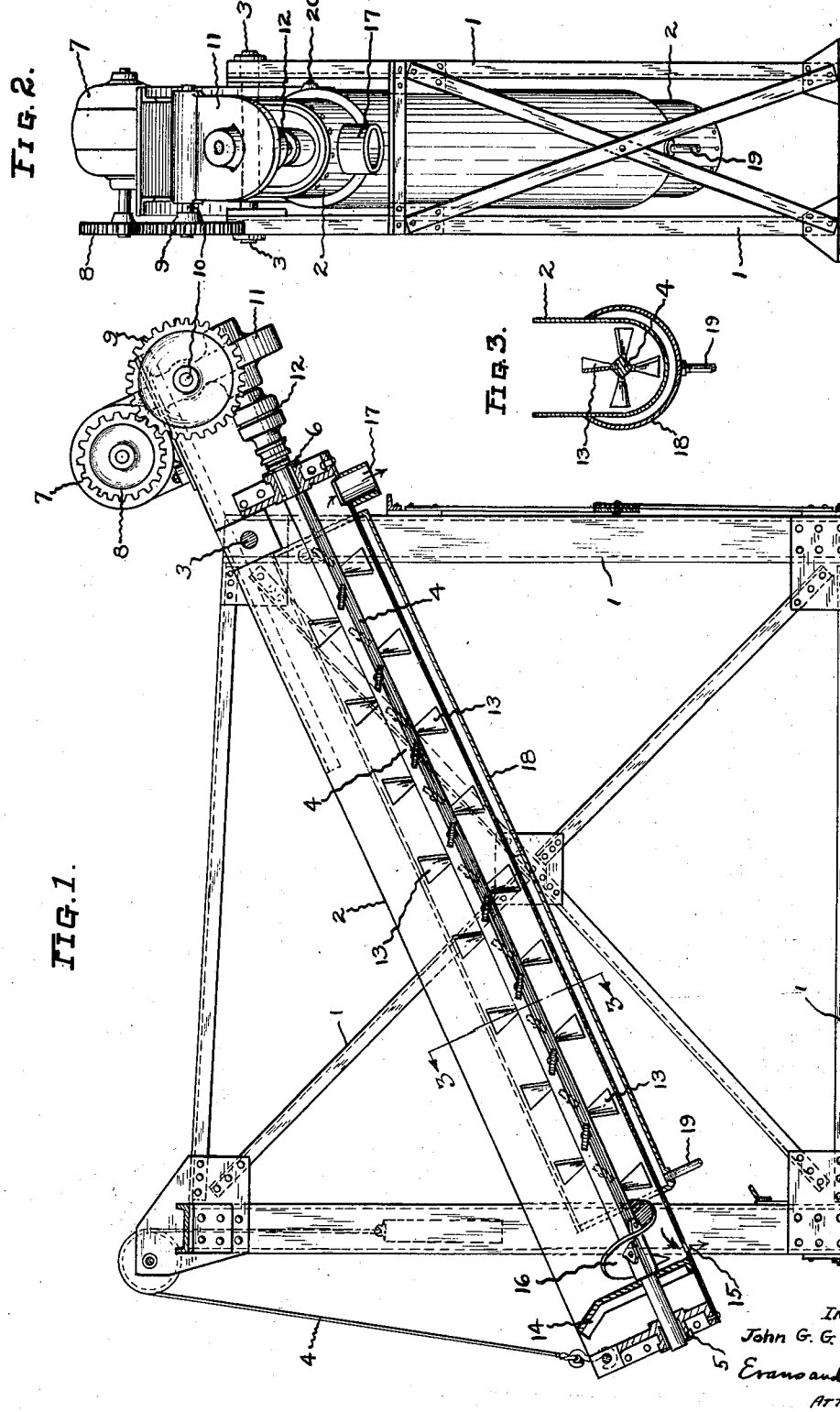
INVENTOR
John G. G. Frost
Evans and McCoy
ATTORNEYS Patented Jan. 18, 1927.

1,615,009

UNITED STATES PATENT OFFICE.

JOHN G. G. FROST, OF CLEVELAND, OHIO, ASSIGNOR TO THE NATIONAL SMELTING COMPANY, OF CLEVELAND, OHIO, A CORPORATION OF OHIO.

PROCESS OF TREATING ALUMINUM DROSS AND THE LIKE.

Application filed March 17, 1926. Serial No. 95,271.

This invention relates to the recovery of fine particles of molten metal carried by hot dross, skimmings and the like, and to the cooling of such dross material.

In the remelting of metal borings, skimmings and the like, such as, for example, aluminum borings, a dross is formed containing fine particles of molten metal, which particles, however, cannot be recovered from the dross by ordinary smelting. The recovery of metal contained in such dross has heretofore been expensive and unsatisfactory.

Moreover, the dross from which it is desired to recover molten aluminum is very hot. After the treatment of said dross, as by the process herein disclosed, a small amount of aluminum may still remain unrecovered. If such remaining dross were not cooled, any aluminum therein would react by the aluminothermic reaction with oxides in the dross, thus making more difficult the recovery of any such remaining aluminum and rendering the disposal of such dross difficult and frequently dangerous, due to the exothermic nature of such reaction It is thus also desirable that such remaining dross be cooled below the temperature at which the above mentioned aluminothermic reaction may be maintained But even without the presence of any remaining aluminum, it is very desirable that such dross be cooled before disposal thereof.

An object of this invention is to provide a method of readily removing finely divided particles of molten metal from dross and the like.

Another object of my invention is to provide an economical method whereby molten aluminum may be recovered from dross and the like containing aluminum in small molten particles.

A further object of the invention is to provide a continuous and substantially automatic process of recovering aluminum from aluminum dross, skimmings and the like.

Another object of the invention is to provide an efficient and economical method of cooling hot dross for safe and convenient disposal thereof.

A further object of this invention is to provide a continuous process of recovering aluminum from dross and the like and, after recovery of aluminum therefrom, of cooling the remainder of such dross to a temperature below that at which an aluminothermic reaction may be maintained.

Other objects of the invention will be apparent to those skilled in the art from the description of it hereinafter given.

In the drawings:

Figure 1 is a vertical section of an apparatus suitable for the practice of my invention;

Fig. 2 is an end elevation of the apparatus shown in Fig. 1; and

Fig. 3 is a vertical section on line 3—3 of Fig. 1.

I have found that molten metal, for example, molten aluminum, when present in dross and the like in finely divided particles, may be readily recovered by conveying said dross through a container with simultaneous agitation, whereby the molten metal is coagulated into larger particles. The coagulated molten metal, for example, aluminum, may be readily accumulated and removed from the container in molten condition and the remainder of the dross cooled and separately removed from said container.

A suitable framework 1 may be provided to support the substantially U-shaped trough or container 2 in inclined position. If desired, the container 2 may be pivotally supported by means of the trunnion member 3. The degree of inclination of the container 2 may then be regulated by means of the counterweighted cord 4. The optimum inclination of the container 2 may be different for various materials to be treated. It will be understood, however, that the container 2 may be fixed in a particular inclined position. The dross or similar material to be treated may be conveyed through the container and agitated therein by means of a conveyor having a conveyor shaft 4. The shaft 4 is shown as mounted in suitable bearings 5 and 6 and may be rotated by means of the motor 7 mounted at the upper end of the container and connected to the shaft 4 through suitable gears, including the spur gears 8 and 9, the gear 9 being shown as mounted on a shaft 10. From the gear 9 the power may be transmitted to the shaft 4 by means of a worm (not shown) mounted on the shaft 10 and a worm gear (not shown) disposed within the housing 11. Clutch mechanism is shown at 12. The portion of the shaft 4 disposed within the container 2 is shown as square and as provided with spaced paddles 13, which may be threaded into the shaft 4, or otherwise suitably affixed thereto.

Adjacent the lower end of the container 2 is a member 14 extending substantially across the interior of the container, which member assists in protecting the bearing 5 from the heat of the dross. Also disposed adjacent the lower end of the container 2 is an aperture 15 through which recovered molten metal, such as aluminum, may be withdrawn or removed. Between the member 15 and the lowest paddle 13 is shown a screw portion 16 mounted on the shaft 4 adapted to guide the material to be treated directly to the conveyor paddles 13. At the upper end of the container is disposed aperture 17, through which the remainder of the dross, after the recovery of metal therefrom, may be removed from the container.

Partially surrounding the container 2 is shown a jacket 18, having fluid connections 19 and 20. Through the jacket 18 a cooling liquid, such as water, may be caused to flow to assist in cooling the dross remaining after the recovery of aluminum below the temperature at which an aluminothermic reaction may be maintained and to a temperature suitable for the convenient disposal of said dross. Such cooling also assists in reducing deterioration of the container 2 by the hot dross. It may be desirable to have the cold liquid enter the jacket through the connection 20 in order that the greatest cooling effect may be imparted to the dross which is about to be discharged through the container outlet 17, whereby any unrecovered aluminum remaining in said dross is preferably solidified, so that any such remaining aluminum may be subsequently recovered more readily and completely by a suitable method. The amount of cooling exerted by a cooling liquid is preferably insufficient, however, to cause any recovered molten metal to solidify within the container 2. It may be noted that the aperture 15 is preferably left open so that molten metal may continuously drip out therefrom into a suitable receptacle. In this manner none of the recovered metal solidifies within the container to obstruct the operation thereof.

In operation, hot dross, skimmings and the like containing molten metal, such as aluminum in finely divided particles, is disposed within the container 2 adjacent the lower end thereof. The screw 16 conveys the material to be treated, such as dross, directly to the paddles 13, which are preferably so arranged that a paddle 13 agitates the hot dross and simultaneously picks it up, moving it in a direction upwardly of the container, by which agitation and movement the very small molten particles of aluminum contained therein rub together or coagulate to produce larger molten particles. Such enlarged particles of molten metal drop to the inclined container 2 and roll down the incline toward the outlet aperture 15. The dross, however, remains in the container substantially in the position in which it was dropped and is further agitated and conveyed upwardly of the inclined container 2 by the next higher paddle blade. By force of gravity, the recovered molten aluminum flows down through the container and out through the aperture 15 and may be collected in any suitable receptacle disposed beneath said aperture. The remaining dross is conveyed upwardly of the container and discharged therefrom through the aperture 17.

It will be understood that the rate of rotation of the paddle blades and the rate of feeding the dross in the container is such that a large proportion of the molten metal content of the dross has been recovered when said dross is discharged through the upper aperture 17. Referring to Fig. 3, the direction of rotation of the screw 4, with the construction shown by the drawings, is preferably clockwise.

It will thus be seen that I have provided a method whereby molten metal of dross, skimmings and the like may be readily and efficiently recovered with substantially automatic equipment and with a minimum amount of labor.

It will also be seen that I have provided a convenient process of cooling hot dross and the like to render the disposal of said dross convenient and safe.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The method of recovering metallic aluminum from hot aluminum dross or the like containing finely divided particles of molten aluminum, which comprises conveying said dross upwardly of an inclined container, causing particles of said molten aluminum to coagulate, and permitting said recovered molten aluminum to flow downwardly of said container.

2. The method of recovering metallic aluminum from hot aluminum dross or the like containing finely divided particles of molten aluminum, which comprises conveying said dross longitudinally of a container, causing particles of said molten aluminum to coagulate, and removing said recovered molten aluminum from said container.

3. The method of recovering metallic aluminum from hot aluminum dross or the like containing finely divided particles of molten aluminum, which comprises conveying said dross upwardly of an inclined container, agitating said dross to coagulate particles of said molten aluminum, and permitting said recovered molten aluminum to flow downwardly of said container.

4. The method of recovering metallic aluminum from hot aluminum dross or the like containing finely divided particles of molten aluminum, which comprises conveying said dross upwardly of an inclined container, agitating said dross to coagulate particles of said molten aluminum, conveying the remainder of said dross upwardly and outwardly of said container and simultaneously cooling said retaining dross.

5. The method of recovering metallic aluminum from hot aluminum dross or the like containing finely divided particles of molten aluminum, which comprises disposing said dross in an inclined container, conveying said dross upwardly of said container, causing particles of said molten aluminum to coagulate, removing said recovered molten aluminum from said container, and conveying the remainder of said dross upwardly and outwardly of said container.

6. The method of continuously recovering metallic aluminum from hot aluminum dross or the like containing finely divided particles of molten aluminum, which comprises disposing said dross in an inclined container, conveying said dross upwardly of said container, simultaneously agitating said dross to coagulate particles of said molten aluminum, permitting said recovered molten aluminum to flow downwardly and outwardly of said container, and conveying the remainder of said dross upwardly and outwardly of said container.

7. The method of recovering metal from hot dross or the like containing finely divided particles of molten metal, which comprises disposing said dross in an inclined container, conveying said dross upwardly of said container, simultaneously agitating said dross to coagulate particles of said molten metal, permitting said recovered molten metal to flow downwardly of said container, and conveying the remainder of said dross upwardly of said container.

8. The method of recovering metallic aluminum from hot aluminum dross or the like containing finely divided particles of molten aluminum, which comprises conveying said dross upwardly of an inclined container, agitating said dross to coagulate particles of said molten aluminum, removing said recovered molten aluminum from said container, and cooling said container to a degree sufficient to render the remainder of said dross aluminothermically inactive but insufficient to cause said recovered molten aluminum to solidify.

9. The method of continuously recovering metallic aluminum from hot aluminum dross or the like containing finely divided particles of molten aluminum, which comprises disposing said dross in an inclined container, conveying said dross upwardly of said container, simultaneously agitating said dross to coagulate particles of said molten aluminum, permitting said recovered molten aluminum to flow downwardly and outwardly of said container, conveying the remainder of said dross upwardly and outwardly of said container, and cooling said container to a degree sufficient to render the remainder of said dross aluminothermically inactive but insufficient to cause said recovered molten aluminum to solidify.

10. The method of handling hot dross or the like containing molten metallic aluminum, which comprises conveying said dross upwardly of an inclined container, agitating said dross to coagulate particles of said molten aluminum and to cool said dross, permitting said recovered molten aluminum to flow downwardly of said container, and cooling said container to further cool said dross and to solidify any unrecovered aluminum remaining in said dross.

In testimony whereof I affix my signature.

JOHN G. G. FROST.